United States Patent
Cha et al.

(10) Patent No.: US 10,628,810 B2
(45) Date of Patent: Apr. 21, 2020

(54) AUTOMATIC TELLER MACHINE

(71) Applicant: Nautilus Hyosung Inc., Seoul (KR)

(72) Inventors: Jae Min Cha, Gyeonggi-do (KR); Hee Youn Lee, Gyeonggi-do (KR); Jae Min Park, Gyeonggi-do (KR); Joonhee Kim, Seoul (KR)

(73) Assignee: HYOSUNG TNS INC., Seoul (KR)

(*) Notice: Subject to any disclaimer, the term of this patent is extended or adjusted under 35 U.S.C. 154(b) by 143 days.

(21) Appl. No.: 15/225,913

(22) Filed: Aug. 2, 2016

(65) Prior Publication Data

US 2017/0308877 A1 Oct. 26, 2017

(30) Foreign Application Priority Data

Apr. 26, 2016 (KR) .................. 10-2016-0050818
Jun. 3, 2016 (KR) .................. 10-2016-0069712

(51) Int. Cl.
*G06Q 20/10* (2012.01)
*G07F 19/00* (2006.01)
*G06Q 20/18* (2012.01)

(52) U.S. Cl.
CPC ......... *G06Q 20/1085* (2013.01); *G06Q 20/18* (2013.01); *G07F 19/201* (2013.01)

(58) Field of Classification Search
CPC ............. G06Q 20/102; G06Q 20/1085; G06Q 20/042; H04M 1/18
USPC ........................................ 235/379; 705/43
See application file for complete search history.

(56) References Cited

U.S. PATENT DOCUMENTS

| 5,748,728 A * | 5/1998 | Ginsberg | H04M 1/18 379/447 |
| 6,296,079 B1 * | 10/2001 | McNaughton | G06Q 20/18 109/45 |
| 6,494,363 B1 * | 12/2002 | Roger | G07F 19/20 235/379 |
| 6,554,185 B1 * | 4/2003 | Montross | G07D 11/009 235/379 |
| 6,874,682 B2 * | 4/2005 | Utz | G06Q 20/042 235/379 |
| 7,100,819 B1 * | 9/2006 | Green | G06Q 20/1085 235/375 |

(Continued)

FOREIGN PATENT DOCUMENTS

| CN | 203870664 U | * | 10/2014 | |
| CN | 205983686 U | * | 2/2017 | G07F 19/00 |

(Continued)

*Primary Examiner* — Daniel S Felten
(74) *Attorney, Agent, or Firm* — Bacon & Thomas, PLLC

(57) ABSTRACT

An automatic teller machine includes a first interface unit, a second interface unit, a front panel and a control unit. The first interface unit is configured to display financial information for financial transaction to a user. The second interface unit is disposed in a region different from a region in which the first interface unit is disposed. The second interface unit has a plurality of operation parts to be operated by the user. The front panel is movable to a first position in which the operation parts are hidden from the outside of the automatic teller machine and a second position in which the operation parts are exposed to the outside of the automatic teller machine. The control unit is configured to control the front panel so as to be located in one of the first position and the second position.

15 Claims, 19 Drawing Sheets

(56) References Cited

U.S. PATENT DOCUMENTS

| | | | | |
|---|---|---|---|---|
| 7,156,296 B2* | 1/2007 | Magee | ............... | G06Q 20/1085 235/379 |
| 8,403,213 B1* | 3/2013 | Gromley | ............... | G07F 19/209 235/375 |
| 8,714,448 B2* | 5/2014 | Lutz | ............... | G07F 19/205 235/375 |
| 8,907,894 B2* | 12/2014 | Gervais | ............... | G06F 3/017 345/157 |
| 9,022,604 B2* | 5/2015 | Harling | ............... | G07F 19/201 362/249.02 |
| 9,368,001 B2* | 6/2016 | Rabanos | ............... | G07F 19/205 |
| 9,858,558 B1* | 1/2018 | Cardinal | ............... | G06Q 20/1085 |
| 2017/0308877 A1* | 10/2017 | Cha | ............... | G06Q 20/1085 |

FOREIGN PATENT DOCUMENTS

| | | | | |
|---|---|---|---|---|
| JP | 40225989 | * | 10/1990 | ............ G07D 13/00 |
| KR | 101335320 | * | 12/2013 | ............ G07F 19/00 |

* cited by examiner

AUTOMATIC TELLER MACHINE

CROSS-REFERENCE TO RELATED APPLICATIONS

This application claims priority to Korean Patent Application No. 10-2016-0050818 filed on Apr. 26, 2016 and Korean Patent Application No. 10-2016-0069712 filed on Jun. 3, 2016, the entire contents of which are incorporated herein by reference.

TECHNICAL FIELD

The present disclosure relates to an automatic teller machine (ATM) and, more particularly, to a display technique and a drive technique of a user interface region of an automatic teller machine.

BACKGROUND ART

An automatic teller machine is installed at a location other than a counter in a financial institution such as a bank or the like and configured to enable a customer to conveniently enjoy various kinds of financial services without depending on the time and place. The automatic teller machine is capable of providing various financial services such as cash deposit/withdrawal, account transfer, balance inquiry, bankbook printing and the like. The automatic teller machine may be said to be one kind of communication terminal device which is connected to a central computer and kept in a data communication state.

The automatic teller machine is installed inside a bank (financial institution) or a general building (public institution, etc.) or at the roadside. For that reason, it is essentially necessary to minimize information exposure.

Furthermore, the automatic teller machine is a device that provides a user interface. Thus, it is necessary for the automatic teller machine to have a simple external structure which can give a sense of beauty to a user and which can well match with a surrounding environment.

In addition, it is necessary to actively change a user interface environment of the automatic teller machine when a user gains access to the automatic teller machine, thereby enhancing the user convenience.

SUMMARY OF THE INVENTION

The present disclosure provides an automatic teller machine capable of preventing exposure of operation parts of the machine and capable of minimizing information exposure.

Furthermore, the present disclosure provides an automatic teller machine which has a simple external structure capable of giving a sense of beauty to a user and capable of well matching with a surrounding environment In addition, the present disclosure provides an automatic teller machine capable of actively changing a user interface environment depending on the situation of a user or the management state of the machine and capable of enhancing the user convenience.

In accordance with an aspect, there is provided an automatic teller machine which includes a first interface unit, a second interface unit, a front panel and a control unit. The first interface unit is configured to display financial information for financial transaction to a user. The second interface unit is disposed in a region different from a region in which the first interface unit is disposed. The second interface unit has a plurality of operation parts to be operated by the user. The front panel is movable to a first position in which the operation parts are hidden from the outside of the automatic teller machine and a second position in which the operation parts are exposed to the outside of the automatic teller machine. The control unit is configured to control the front panel so as to be located in one of the first position and the second position.

The control unit may be configured to control the front panel so as to be located in the first position when the automatic teller machine is operated in a standby mode in which the financial transaction is not performed, and to control the front panel so as to be located in the second position when the automatic teller machine is operated in an operation mode in which the financial transaction is performed.

The first interface unit may be configured to display advertisement information in the standby mode.

The automatic teller machine may further include a detection unit configured to detect access of the user. The control unit may be configured to switch the standby mode to the operation mode when the access of the user is detected by the detection unit.

The first interface unit may include a touch-input-type display module, and the control unit may be configured to switch the standby mode to the operation mode when touch input of the user through the display module is detected in the standby mode.

The first interface unit may be installed in a front upper region of the automatic teller machine, the second interface unit may be installed below the first interface unit, and the front panel may be configured to slide up or down from the first position toward the second position.

The front panel may be made of a transparent material, and the second interface unit may further include a light source configured to illuminate the operation parts.

The first interface unit may be installed in a front upper region of the automatic teller machine. The second interface unit may be installed below the first interface unit. The front panel may be a movable transparent front panel slidably installed in front of the first interface unit and located in one of the first position in which the first interface unit and the second interface unit are hidden and the second position in which the second interface unit is exposed to the outside.

The second interface unit may include a first arrangement area in which some of the operation parts are disposed and a second arrangement area in which the remaining operation parts are disposed.

The second arrangement area may include an exposed area which is always exposed even when the front panel is moved to the first position, and a wireless receiving unit configured to receive information for financial transaction from the user in a wireless manner may be disposed in the exposed area.

The first arrangement area may be configured to protrude forward from the automatic teller machine when the front panel is moved to the second position.

The operation parts may include at least one of a pin pad installed in the second arrangement area to receive information for financial transaction and a deposit/withdrawal port installed in the second arrangement area to allow the user to deposit or withdraw cash or a check.

The operation parts may include at least one of a card insertion/removal port disposed in the first arrangement area to allow the user to insert or remove a financial transaction card and a transaction slip discharge port disposed in the first arrangement area to discharge a financial transaction slip.

In accordance with another aspect, there is provided an automatic teller machine which includes a first interface unit, a second interface unit, a lower panel and a control unit. The first interface unit is configured to display financial information for financial transaction to a user. The second interface unit is disposed below the first interface unit and provided with a plurality of operation parts to be operated by the user. The lower panel is disposed below the first interface unit and configured to move up and down to a first position in which the operation parts are hidden from the outside of the automatic teller machine and a second position in which the operation parts are exposed to the outside of the automatic teller machine. The control unit is configured to control the lower panel so as to be located in one of the first position and the second position.

The second interface unit may include a first arrangement area in which some of the operation parts are disposed and a second arrangement area in which the remaining operation parts are disposed.

The first interface unit may be configured to be tilted so that an upper portion of the first interface unit moves away from or toward the user.

In accordance with a further another aspect, there is provided an automatic teller machine which includes a first interface unit, a second interface unit and a control unit. The first interface unit is configured to display financial information for financial transaction to a user and vertically slidably disposed in a front upper region of the automatic teller machine. The second interface unit is disposed below the first interface unit and provided with a plurality of operation parts to be operated by the user. The control unit is configured to control the first interface unit so as to be located in one of a first position in which the operation parts are hidden from the outside of the automatic teller machine and a second position in which the operation parts are exposed to the outside of the automatic teller machine.

According to the embodiments of the present disclosure, it is possible for the automatic teller machine to prevent exposure of the operation parts of the automatic teller machine and to decrease information exposure. A simple external structure is employed in the automatic teller machine. This makes it possible to enhance the marketability of the machine and to optimize the screen information expression. It is therefore possible to enhance the operation convenience and to increase the corporate marketing utilization. In addition, it is possible to provide different convenience functions in view of the physical situation of a user, for example, the physical situation of a handicapped user who uses a wheelchair or who suffers from a visual or aural problem.

DETAILED DESCRIPTION

Figure 1:
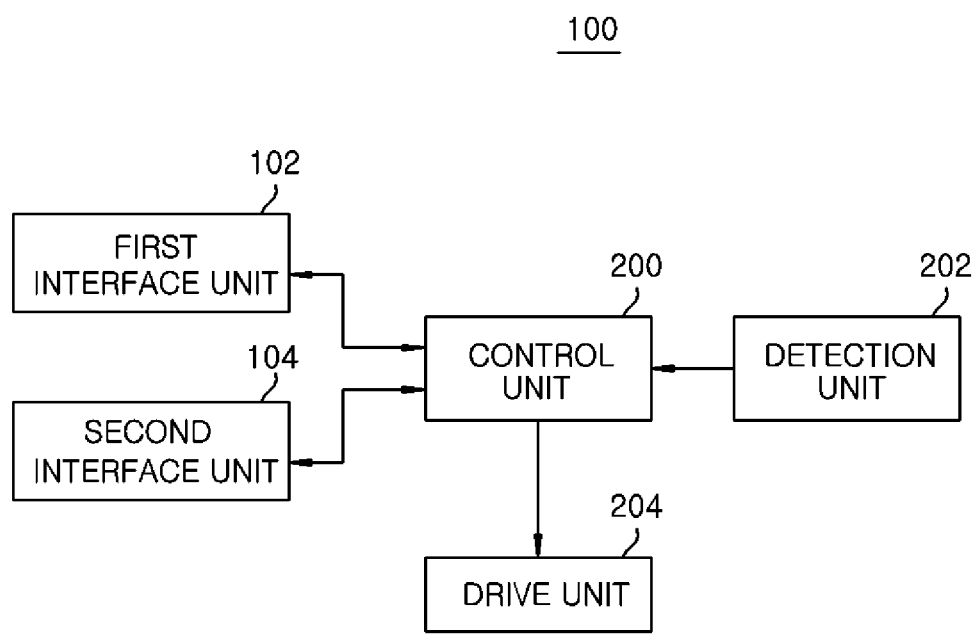
FIG. 1 is an exemplary block diagram of an automatic teller machine according to an embodiment.

Advantages, features and methods for achieving them will become apparent from the embodiments which will be described later in detail with reference to the accompanying drawings. However, the present disclosure is not limited to the embodiments described herein below but may be implemented in many different forms. The embodiments are provided to make complete the present disclosure and to completely inform the scope of the present disclosure to a person having an ordinary knowledge in the field to which the present disclosure pertains. The present disclosure is defined only by the claims. Throughout the specification, the same components are designated by like reference numerals.

In describing the embodiments of the present disclosure, the detailed descriptions of well-known functions or configurations will be omitted if it is determined that the detailed descriptions of well-known functions or configurations may unnecessarily make obscure the spirit of the present disclosure. The terms to be described later are defined in view of the functions exercised in the embodiments of the present disclosure and may vary depending on the intention of a user or an operator and the practice. Thus, the definition of terms shall be made based on the overall contents of the subject specification.

Embodiments of the present disclosure will now be described in detail with reference to the accompanying drawings.

FIG. 1 is an exemplary block diagram of an automatic teller machine according to an embodiment. The automatic teller machine may include a first interface unit 102, a second interface unit 104, a control unit 200, a detection unit 202, a drive unit 204, and so forth. The automatic teller machine may include not only the aforementioned functional modules but also various configurations employed in a typical automatic teller machine, for example, a deposit/withdrawal port of a cash deposit/withdrawal unit, a deposit/withdrawal port of a check deposit/withdrawal unit, a deposit/withdrawal port of a card processing unit and a discharge port of a transaction slip issuing unit.

As illustrated in FIG. 1, the first interface unit 102 may be disposed on an upper front surface of the automatic teller machine in order to enhance the visibility thereof and to increase the business and marketing effects. According to embodiments of the present disclosure, the first interface unit 102 can make an interactive expression and, therefore, can display not only financial information for performing financial transaction but also advertisement or business information. For example, in a standby mode of the automatic teller machine, advertisement or business information may be displayed through the first interface unit 102. In an operation mode, financial transaction information may be displayed through the first interface unit 102.

The first interface unit 102 may include a display module having, for example, a liquid crystal display (LCD) or organic light emitting diodes (OLEDs), and a touch pad (not shown) for enabling a user to perform touch input. The display module may be driven in response to a control signal of the control unit 200 which will be described later. A user's touch input signal may be inputted to the control unit 200 through the touch pad.

The second interface unit 104 may be disposed in a region different from the region in which the first interface unit 102 is disposed. The second interface unit 104 may include a plurality of operation parts through which financial information for performing financial transaction is received from a user. The second interface unit 104 may exchange an interface signal with the control unit 200.

The operation parts of the second interface unit 104 may include an interface environment for inputting financial information including security information and a physical interface environment required in automatic teller services. The interface environment for inputting financial information may include, for example, a pin pad interface environment. The physical interface environment may include, for example, the deposit/withdrawal port of the cash deposit/withdrawal unit, the deposit/withdrawal port of the check deposit/withdrawal unit, the deposit/withdrawal port of the card processing unit and the discharge port of the transaction slip issuing unit. While there has been described an example in which the pin pad is included in the second interface unit 104, this description is an exemplary one for facilitating the understanding of the present disclosure. It should be noted that the pin pad may be manufactured in the form of a touch screen and may be included in the first interface unit 102.

Furthermore, a near field communication (NFC) module may be installed on an outer surface of the second interface unit 104. Use of the NFC module makes it possible to pre-input information through an application and enables a user to rapidly finish automatic teller transaction through the contact with the NFC module. Specifically, it is preferred that a receiving unit of the NFC module is exposed to the outside of the automatic teller machine.

Moreover, a fingerprint recognition module may be installed on the outer surface of the second interface unit 104. The fingerprint recognition module serves to enhance the security of the automatic teller machine and the reliability of financial transaction.

The control unit 200 is connected to the first interface unit 102 and the second interface unit 104. The control unit 200 may receive information from the first interface unit 102 and the second interface unit 104 or may output a control signal to the first interface unit 102 and the second interface unit 104. The control unit 200 may be formed of, for example, a central processing unit (CPU), a memory and the like. In this regard, the memory may include a main memory such as a random access memory (RAM) or the like, a register installed within the CPU, a cache memory serving as an intermediate storage, a hard disk configured to store actual data, and so forth.

Furthermore, the control unit 200 may control the below-described drive unit 204 to operate hiding/exposure units (which will be described in following embodiments), whereby the second interface unit 104 having a plurality of operation parts can be exposed to the outside of the automatic teller machine or can be hidden from the outside of the automatic teller machine. For example, the control unit 200 may control the drive unit 204 so that if a user gains access to the automatic teller machine, a front panel (which will be described in the following embodiment) installed on the front surface of the automatic teller machine sequentially performs a tilting operation and a sliding-up operation and so that if there is no movement of a user, the front panel sequentially performs a sliding-down operation and a tilting operation. The front panel may be made of a transparent material and may be a shutter type or a glass type. The glass type referred to herein means a type in which the front panel operates in front of the first interface unit 102 and the second interface unit 104 to expose or hide the second interface unit 104. The shutter type referred to herein means a type in which the front panel operates only in front of the second interface unit 104 to expose or hide the second interface unit 104 more rapidly than the glass type. The shutter type and the glass type will be described in more detail in the following embodiments.

Moreover, the control unit 200 may receive a detection signal from the detection unit 202 which will be described later. Then, the control unit 200 may output a display control signal to the first interface unit 102 or may output a drive control signal to the drive unit 204 which will be described later.

In addition, the control unit 200 may perform situation-dependent modes depending on the operation state of the automatic teller machine. The situation-dependent modes may include, for example, a standby mode, an operation mode, a constant-operation mode and a stop mode.

The standby mode refers to a state in which the second interface unit 104 is hidden to become invisible from the outside of the automatic teller machine and a mode in which, for example, advertisement information or business information is displayed through the first interface unit 102.

The operation mode refers to a state in which the control unit 200 drives the drive unit 204 so that the second interface unit 104 is exposed to the outside of the automatic teller machine and a mode in which financial transaction information is displayed through the first interface unit 102. The state in which the second interface unit 104 is exposed to the outside of the automatic teller machine refers to, for example, a case where the shutter type or glass type front panel is tilted and slid up, a case where the first interface unit 102 is slid up, or a case where a lower panel is slid down.

The standby mode or the operation mode may be performed during a financial business time period, for example, a time period of 09:00 to 16:00. In the standby mode, the second interface unit 104 may be hidden from the outside of the automatic teller machine while displaying advertisement information or the like through the first interface unit 102. In the operation mode, the second interface unit 104 may be exposed to the outside of the automatic teller machine while displaying financial transaction information on the first interface unit 102.

The constant operation mode refers to a state in which the control unit 200 drives the drive unit 204 in advance so that the second interface unit 104 is always exposed to the outside of the automatic teller machine during a predetermined time period and a mode in which financial transaction information is always displayed through the first interface unit 102.

The constant operation mode may be performed during a time period in which the automatic teller machine is crowded with users, for example, a time period of 11:00 to 13:00.

The stop mode refers to a mode in which the operation of the automatic teller machine is stopped during a specific time period, for example, a midnight time period. The stop mode and the standby mode may be switched to the operation mode when the first interface unit 102 is touched by a user and the intention to use the automatic teller machine is received.

The detection unit 202 may be disposed in an arbitrary position outside the automatic teller machine. The detection unit 202 serves to detect body information of a user existing around the automatic teller machine and to provide a detection signal to the control unit 200.

According to the embodiments of the present disclosure, information is displayed through a large-screen display device while hiding the operation parts. In this state, if a user moves toward the automatic teller machine, the hidden operation parts are exposed. This helps decrease the exposure time of the operation parts. To this end, the detection unit 202 for recognizing a user may be disposed around the automatic teller machine.

The detection unit 202 may include, for example, a proximity sensor, a face recognition sensor or the like. In response to the proximity sensor or the face recognition sensor, the control unit 200 to perform a drive operation of the first interface unit 102 or the second interface unit 104 through the drive unit 204. For example, when a user is detected by the proximity sensor or the face recognition sensor, the first interface unit 102 is allowed to make a tilting operation and a sliding operation, or the front panel disposed on the frost surface of the second interface unit 104 is allowed to make a tilting operation and a sliding operation. This enables the first interface unit 102 and the second interface unit 104 to be exposed to the outside of the automatic teller machine depending on the state of a user. For example, the stature of a user or the wheelchair boarding of a user is determined by a front camera (not shown) capable of recognizing a face. Depending on the determination result, the tilting angle of the front panel disposed in front of the first interface unit 102 or the second interface unit 104 is adjusted in conformity with the user. This makes it possible to minimize exposure of financial information to a third party other than the user who uses the first interface unit 102 and the second interface unit 104. The drive mechanism using the detection unit 202 may be included in the aforementioned operation mode.

The drive unit 204 may include, for example, a motor drive unit or the like. The drive unit 204 serves to change the physical position and state of one of the first interface unit 102, the second interface unit 104, the front panel and the lower panel based on the control signal of the control unit 200. For example, the drive unit 204 may slide or tilt the first interface unit 102 and may cause the second interface unit 104 to protrude from or retract into the automatic teller machine. Furthermore, the drive unit 204 may cause the second interface unit 104 or the front panel disposed in front of the first interface unit 102 to make a tilting operation and a sliding operation under the control of the control unit 200.

Operation processes capable of minimizing exposure of operation parts of the automatic teller machine according to the embodiments of the present disclosure, for example, a plurality of operation parts installed in the second interface unit 104, will be described in more detail together with the aforementioned configurations with reference to FIGS. 2 to 18.

FIGS. 2 to 5 are views illustrating an operation process of an automatic teller machine according to a first embodiment of the present disclosure, which is capable of minimizing exposure of a second interface unit having a plurality of operation parts.

In this embodiment, there is illustrated a shutter type automatic teller machine which is configured to, with a minimum size and a minimum motion, hide a plurality of operation parts installed in a second interface unit. The automatic teller machine may include a machine front portion 100a, a first interface unit 102a, a second interface unit 104a, a front panel 106a, a lower panel 108a, and so forth.

The front panel 106a, e.g., a shutter type front panel made of a transparent material, is disposed in front of the second interface unit 104a which has a plurality of operation parts. The front panel 106a is can be moved to a first position in which the operation parts of the second interface unit 104a are hidden from the outside of the automatic teller machine or a second position in which the operation parts of the second interface unit 104a are exposed to the outside of the automatic teller machine.

The first interface unit 102a may be disposed on a front upper surface of the machine front portion 100a and may serve to display financial information, advertisement information, business information or the like to a user of the automatic teller machine.

The second interface unit 104a may be disposed in a region different from the region in which the first interface unit 102a is disposed. The second interface unit 104a may have a plurality of operation parts to be operated by a user.

The front panel 106a is disposed in front of the second interface unit 104a and has a function of protecting or hiding the second interface unit 104a. If the second interface unit 104a is completely invisible, a user may be unable to recognize the automatic teller machine. Thus, the front panel 106a disposed in front of the second interface unit 104a may be made of a transparent material. In this case, a separate light source (not shown) may be disposed in an area, in which the second interface unit 104a is accommodated, so that a user can easily recognize the operation parts of the second interface unit 104a.

The front panel 106a is movable to the first position in which the operation parts are hidden from the outside and the second position in which the operation parts are exposed to the outside. For example, in the case of the operation mode or in the case where a user gains access to the automatic teller machine, the front panel 106a may sequentially perform a tilting operation and a sliding-up operation under the control of the control unit 200. In the case of the standby mode or in the case where a user's motion is not detected, the front panel 106a may sequentially perform a sliding-down operation and a tilting operation under the control of the control unit 200.

Figure 2:
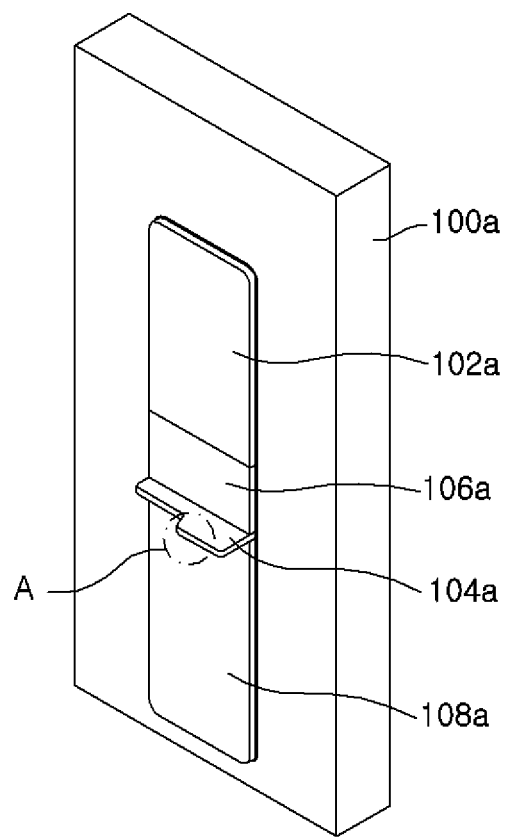
FIGS. 2 to 5 are views illustrating an operation process of an automatic teller machine according to a first embodiment capable of minimizing exposure of a second interface unit having a plurality of operation parts.

As illustrated in FIG. 2, the second interface unit 104a may include an exposed area A which is always exposed even when the front panel 106a is located in the first position in which the operation parts are hidden from the outside. The exposed area A corresponds to a horizontal extension portion of the second interface unit 104a. The exposed area A will be described later with reference to FIG. 19.

Figure 3:
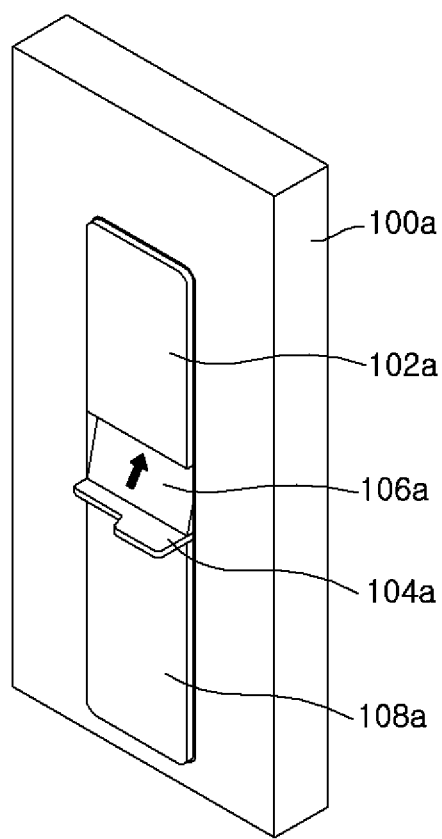

FIG. 3 is a view illustrating a case where the front panel 106a disposed in front of the second interface unit 104a is tilted.

Figure 4:
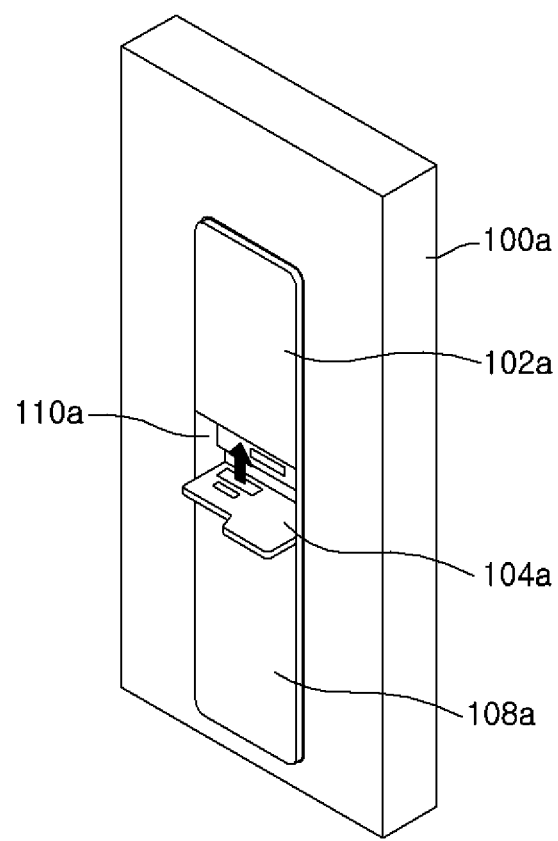

FIG. 4 is a view illustrating a case where the tilted front panel 106a is slid up and moved to the second position so that the operation parts of the second interface unit 104a are exposed to the outside.

Figure 5:
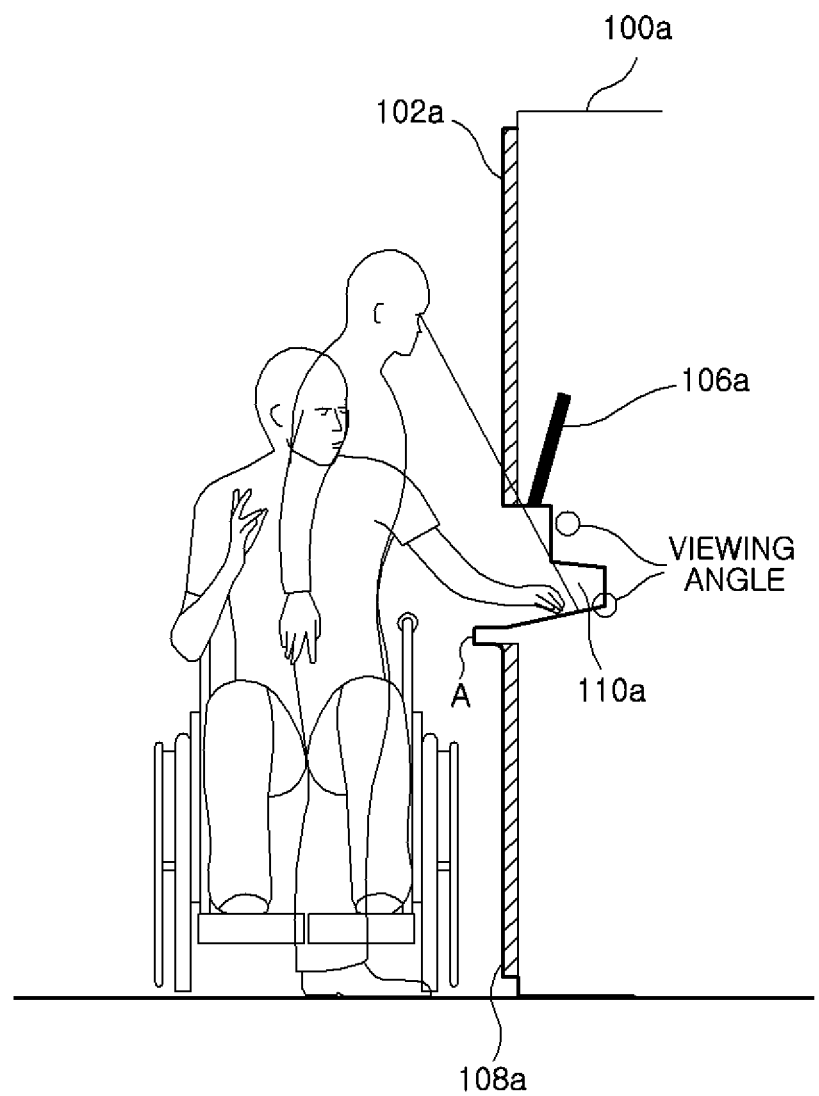

Referring to FIGS. 4 and 5, the operation parts of the second interface unit 104a are disposed within an accommodation section 110a of the machine front portion 100a as illustrated in FIG. 4.

The accommodation section 110a may include opposite side surfaces and an inner surface. That is to say, the accommodation section 110a has an arrangement structure capable of accommodating the operation parts within the machine front portion 100a. When the second interface unit 104a is disposed on the inner surface of the accommodation section 110a, the operation parts of the second interface unit 104a are hidden by the opposite side surfaces of the accommodation section 110a. This makes it possible to enhance the security.

FIG. 5 is a vertical sectional view illustrating the result obtained in FIG. 4. The illustration of a standby mode or a case where the motion of a user is not detected is omitted.

FIGS. 6 to 9 are views illustrating an operation process of an automatic teller machine according to a second embodiment of the present disclosure, which is capable of minimizing exposure of operation parts.

In this embodiment, there is illustrated an automatic teller machine of the type in which the operation parts of a second interface unit are hidden by a first interface unit. The automatic teller machine may include a machine front portion 100b, a first interface unit 102b, a second interface unit 104b, a lower panel 108b, and so forth. An upper display unit, for example, the first interface unit 102b, is used to expose the second interface unit 104b to the outside of the automatic teller machine or to hide the second interface unit 104b from the outside of the automatic teller machine.

Figure 6:
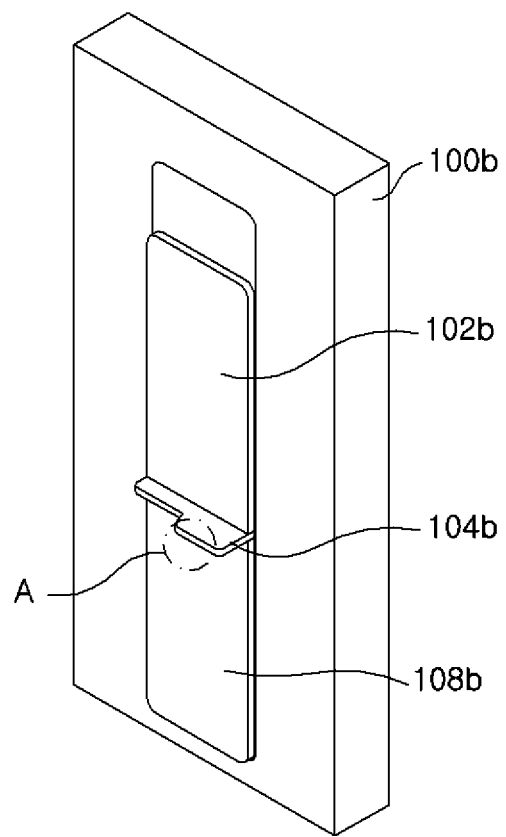
FIGS. 6 to 9 are views illustrating an operation process of an automatic teller machine according to a second embodiment.

As illustrated in FIG. 6, the second interface unit 104b may include an exposed area A which is always exposed even when the upper display unit, for example, the first interface unit 102b, is located in the first position in which the operation parts of the second interface unit 104b are hidden from the outside.

In this embodiment, it is not necessary to additionally employ a front panel. The operation parts installed in the second interface unit 104b is hidden by the first interface unit 102b. When the first interface unit 102b is moved down to hide the operation parts of the second interface unit 104b, it is possible to most effectively utilize an LCD touch area.

Figure 7:
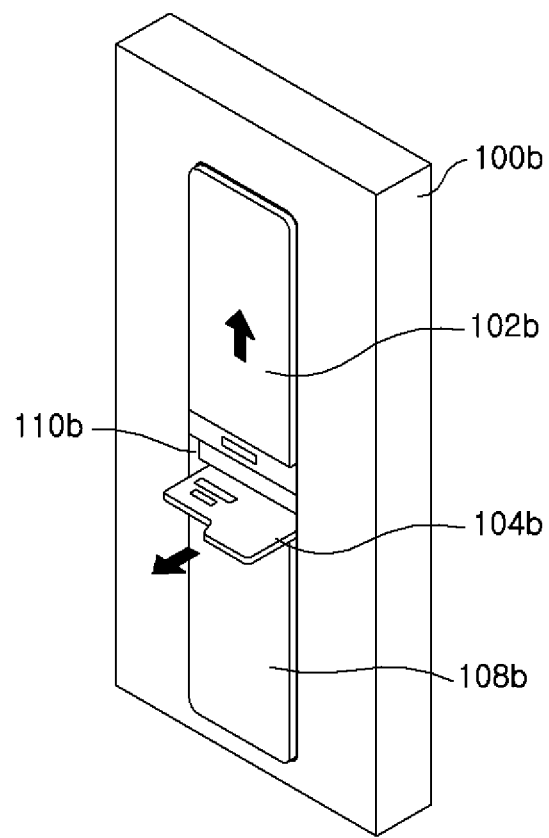

FIG. 7 is a view illustrating a case where, when a user gains access to the automatic teller machine or when the automatic teller machine is in an operation mode, the first interface unit 102b is vertically slid up and moved to the second position under the control of the control unit 200 so that the operation parts installed in the second interface unit 104b are exposed to the outside. As illustrated in FIG. 7, the operation parts of the second interface unit 104b disposed in the accommodation section 110b of the machine front portion 100b protrude forward from the accommodation section 110b after the first interface unit 102b is moved to the second position. This is to enhance the visibility by moving the operation parts of the second interface unit 104b toward a user when a viewing angle is not good due to the existence of the first interface unit 102b. The accommodation section 110a illustrated in FIG. 7 includes an inner surface and opposite side surfaces. Redundant descriptions thereof will be omitted.

Figure 8:
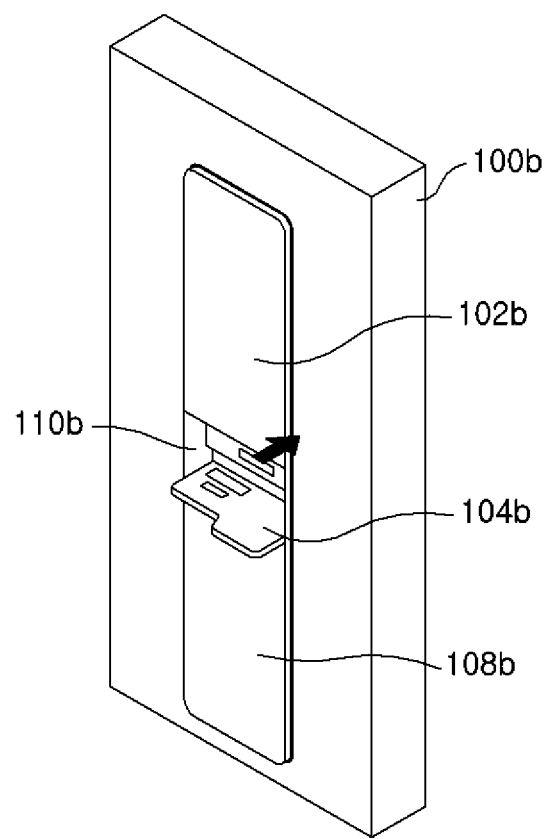

FIG. 8 illustrates a case where the second interface unit 104b retracts into the accommodation section 110b. When a bill recycling machine (BRM) or the like is used in the automatic teller machine, the second interface unit 104b is caused to retract backward, thereby minimizing obstruction such as the interference of a user's hand with the second interface unit 104b during financial transaction. Furthermore, the second interface unit 104b may retract into the accommodation section 110b when there is no motion of a user around the automatic teller machine or when the automatic teller machine is in the standby mode.

Figure 9:
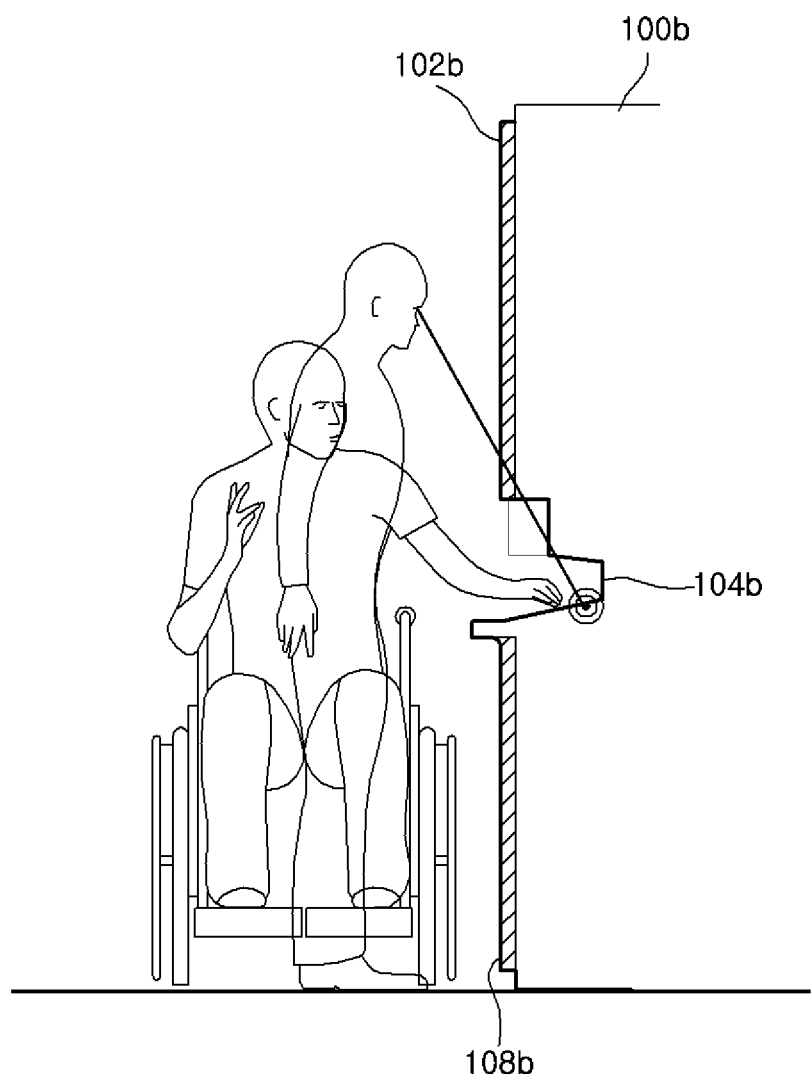

FIG. 9 is a vertical sectional view illustrating the result obtained in FIG. 8. When the automatic teller machine is in the standby mode or when the motion of a user is not detected, the first interface unit 102b may be vertically slid down. The illustration of this situation will be omitted.

FIGS. 10 to 13 are views illustrating an operation process of an automatic teller machine according to a third embodiment of the present disclosure, which is capable of minimizing exposure of operation parts. In this embodiment, the automatic teller machine may include a machine front portion 100c, a first interface unit 102c, a second interface unit 104c, a lower panel 108c, and so forth. The front panel 112 is disposed on the first interface unit 102c as an upper display unit and the second interface unit 104c as an operation unit. The second interface unit 104c is exposed to or hidden from the outside of the automatic teller machine as the front panel 112 is moved to a first position or a second position.

Figure 10:
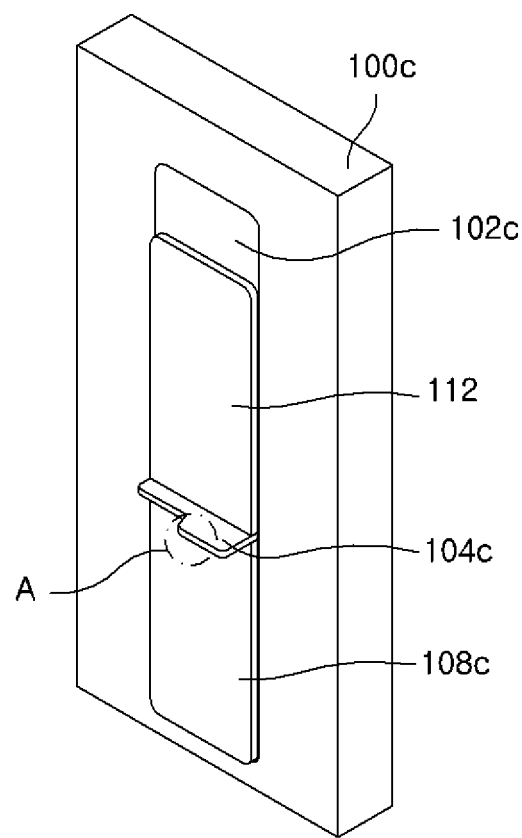
FIGS. 10 to 13 are views illustrating an operation process of an automatic teller machine according to a third embodiment.

As illustrated in FIG. 10, the second interface unit 104c may include an exposed area A which is always exposed even when the upper display unit, for example, the first interface unit 102c, is located in the first position in which the operation parts installed in the second interface unit 104c are hidden from the outside.

Referring to FIG. 10, the front panel 112 is installed at the second interface unit 104c, specifically, installed adjacent to the outwardly facing surface of the machine front portion 100c of the automatic teller machine. The front panel 112 is made of a light transparent material, for example, glass. The operation parts installed in the second interface unit 104c are hidden by moving the front panel 112. Since the operation parts of the second interface unit 104c, an upper LCD and the like can be seen through the front panel 112 by a user, it is easy for the user to recognize the automatic teller machine. In addition, the information displayed on the first interface unit 102c can be seen from the outside through the front panel 112.

Figure 11:
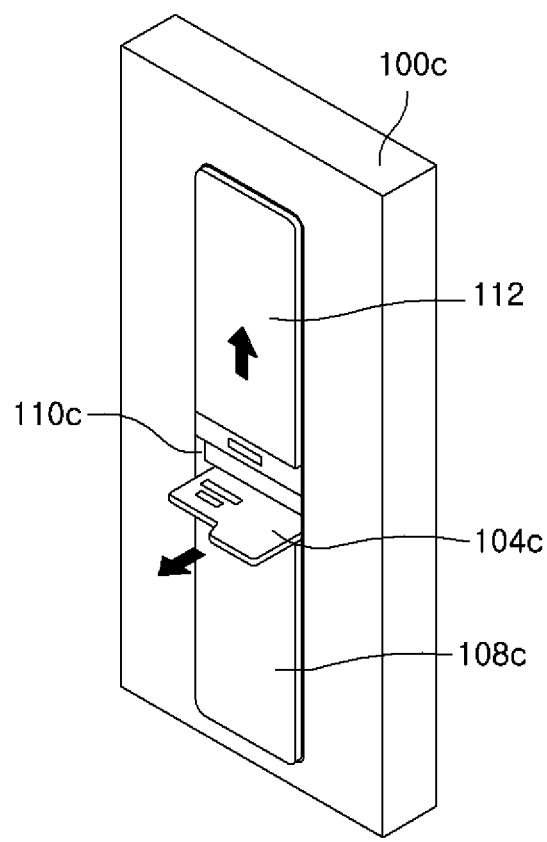

FIG. 11 illustrates a case where, when a user gains access to the automatic teller machine or when the automatic teller machine is in the operation mode, the operation parts installed in the second interface unit 104c are exposed to the outside as the front panel 112 is vertically slid up and moved to the second position under the control of the control unit 200 (with the lower panel 108c kept fixed). As illustrated in FIG. 11, the operation parts of the second interface unit 104c disposed in the accommodation section 110c of the machine front portion 100c protrude forward from the accommodation section 110c after the front panel 112 is moved to the second position. This is to enhance the visibility by moving the operation parts of the second interface unit 104c toward a user when a viewing angle is not good due to the existence of the first interface unit 102c. The accommodation section 110c illustrated in FIG. 11 includes an inner surface and opposite side surfaces. Redundant descriptions thereof will be omitted.

Figure 12:
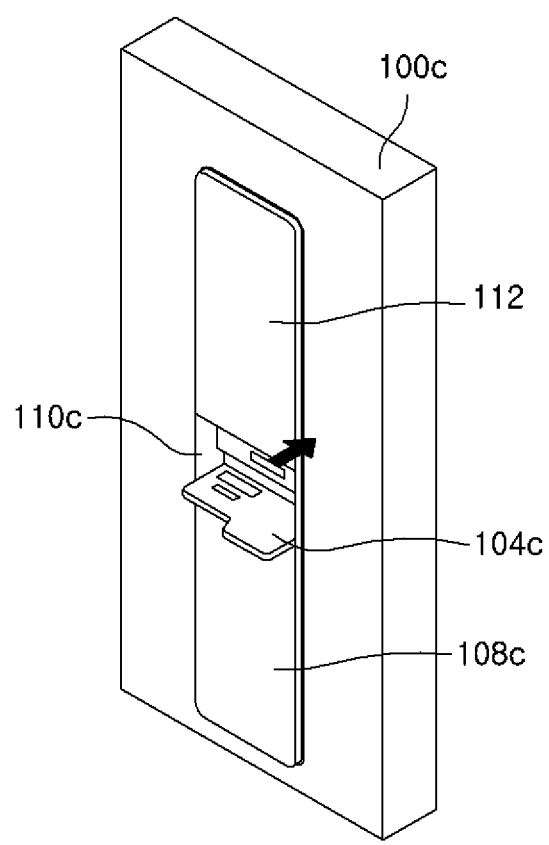

FIG. 12 illustrates a case where the second interface unit 104c retracts into the accommodation section 110c. When a bill recycling machine (BRM) or the like is used in the automatic teller machine, the second interface unit 104c is caused to retract backward, thereby minimizing an obstruction such as the interference of a user's hand with the second interface unit 104c during financial transaction. Furthermore, the second interface unit 104c may retract into the accommodation section 110c when there is no motion of a user around the automatic teller machine or when the automatic teller machine is in the standby mode.

Figure 13:
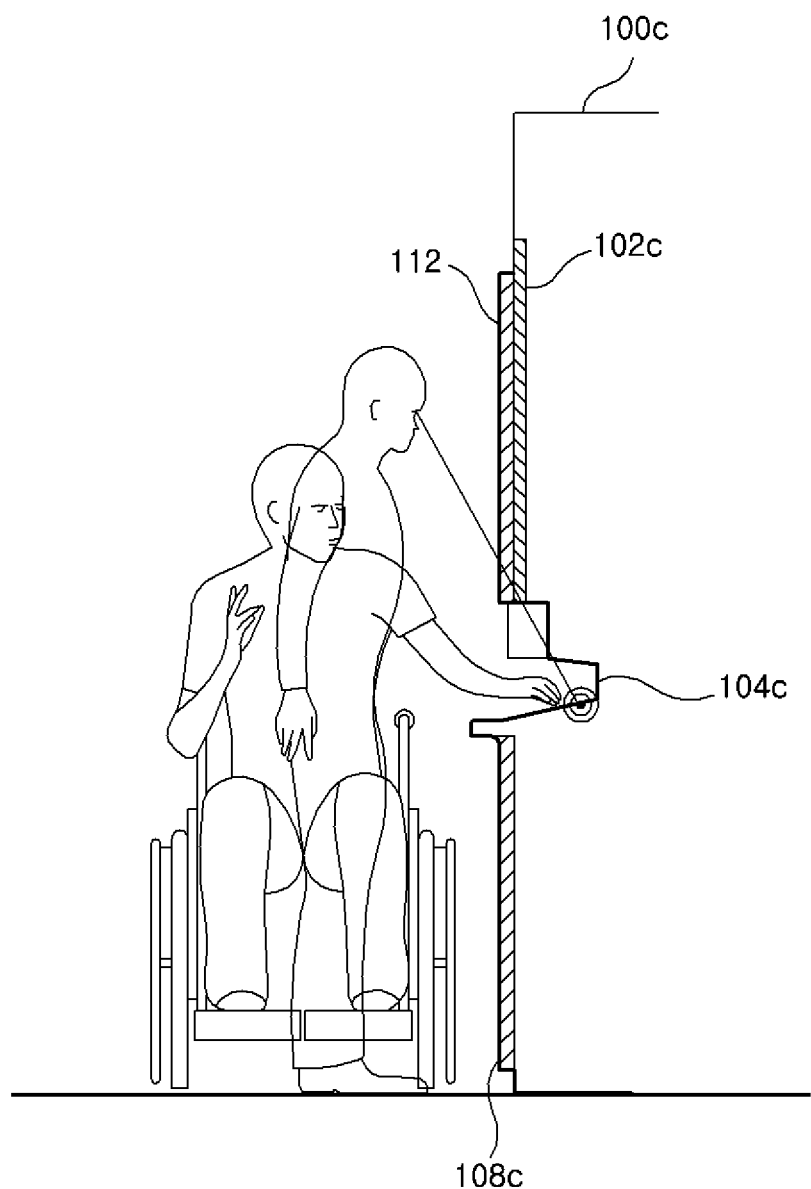

FIG. 13 is a vertical sectional view illustrating the result obtained in FIG. 12. When the automatic teller machine is in the standby mode or when the motion of a user is not detected, the front panel 112 may be vertically slid down. The illustration of this situation is omitted.

FIGS. 14 to 18 are views illustrating an operation process of an automatic teller machine according to a fourth embodiment of the present disclosure, which is capable of minimizing exposure of operation parts. In this embodiment, the automatic teller machine may include a machine front portion 100d, a first interface unit 102d, a second interface unit 104d and a lower panel 108d. The second interface unit 104d is exposed to the outside of the automatic teller machine or hidden from the outside of the automatic teller machine as a lower panel 108d mounted to a lower front surface of the automatic teller machine is moved to a first position or a second position. For example, the first interface unit 102d located on the upper front surface of the automatic teller machine is tilted and the lower panel 108d is slid up or slid down.

Figure 14:
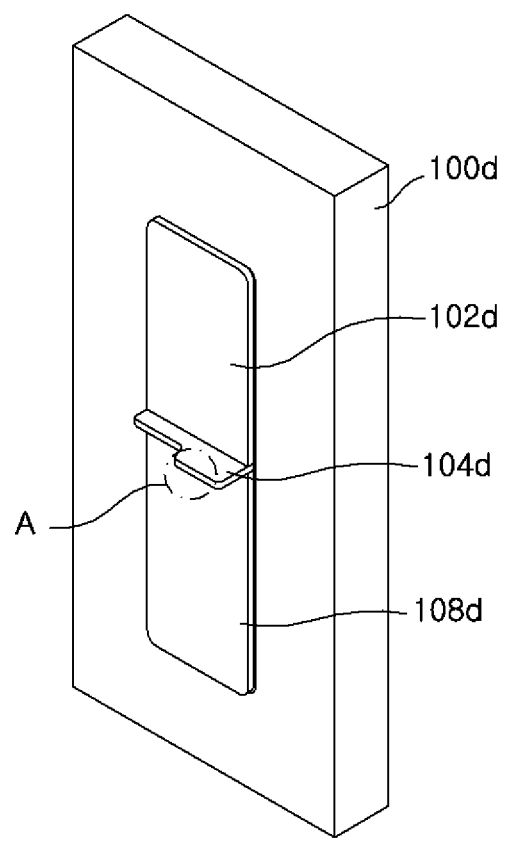
FIGS. 14 to 17 are views illustrating an operation process of an automatic teller machine according to a fourth embodiment.

As illustrated in FIG. 14, the second interface unit 104d may include an exposed area A which is always exposed even when the lower panel 108d is located in the first position in which the operation parts installed in the second interface unit 104d are hidden from the outside.

In FIG. 14, the lower panel 108d is configured to hide the operation parts of the second interface unit 104d.

Figure 15:
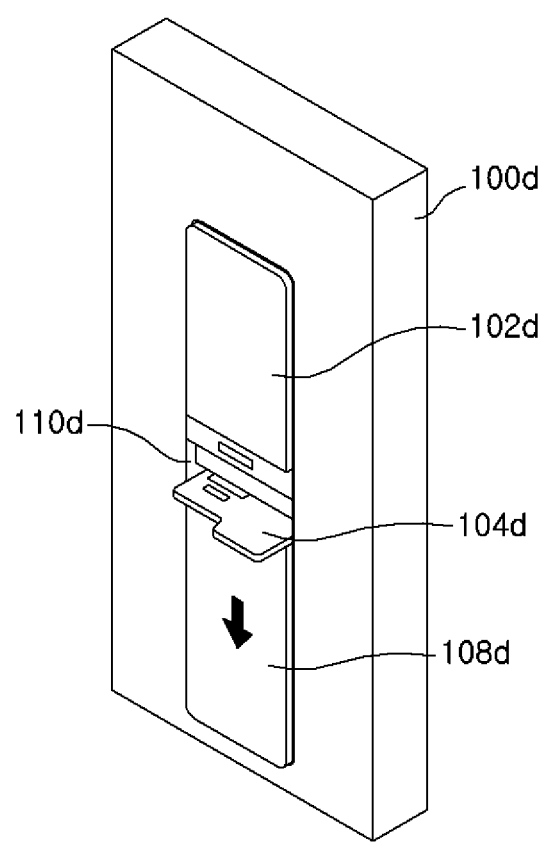

FIG. 15 illustrates a case where, when a user gains access to the automatic teller machine or when the automatic teller machine is in the operation mode, the operation parts of the second interface unit 104d accommodated in the accommodation section 110d are exposed to the outside as the lower panel 108d is slid down under the control of the control unit 200. When the lower panel 108d is slid down, the second interface unit 104d may be moved together in the same direction as the movement direction of the lower panel 108d. The accommodation section 110d illustrated in FIG. 15 includes an inner surface and opposite side surfaces. Redundant descriptions thereof will be omitted.

Figure 16:
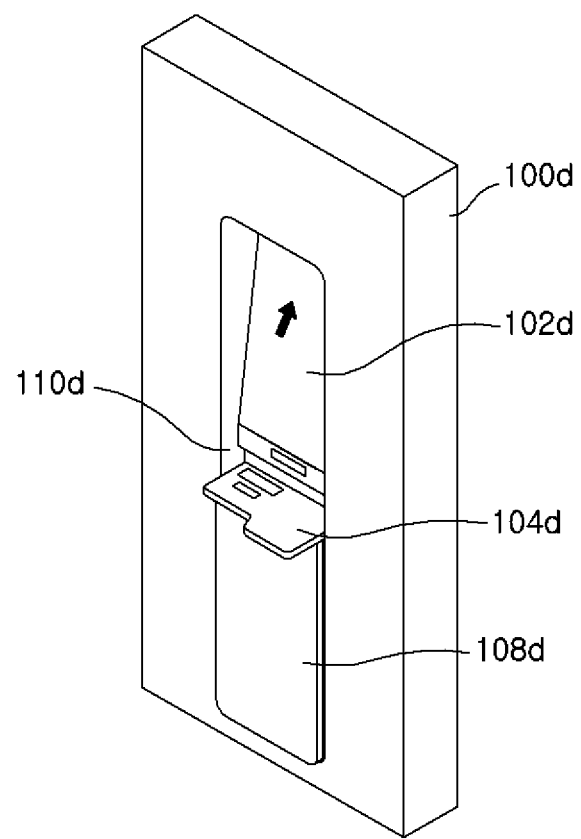

FIG. 16 illustrated a case where the first interface unit 102d is tilted and moved backward. In this case, it is possible to secure a viewing angle for the operation parts of the second interface unit 104d and the bill recycling machine (BRM), and to decrease the interference of a user's hand with the first interface unit 102d.

In FIG. 16, there is illustrated a case where the first interface unit 102d is tilted backward at a predetermined angle after the lower panel 108d is slid down in the vertical direction of the automatic teller machine. If a user uses a wheelchair, the height of eyes of the user is relatively low. In view of this, the first interface unit 102d may be configured to be tilted forward at a predetermined angle.

When controlling the backward tilting operation or the forward tilting operation of the first interface unit 102d, the control unit 200 may control the first interface unit 102d so that the first interface unit 102d moves backward into the accommodation section 110d of the automatic teller machine by a predetermined distance. In this case, the first interface unit 102d located in the upper region is moved backward within the accommodation section 110d. Thus, the display surface of the first interface unit 102d is hidden by the accommodation section 110d. This makes it possible to enhance the security.

Figure 17:
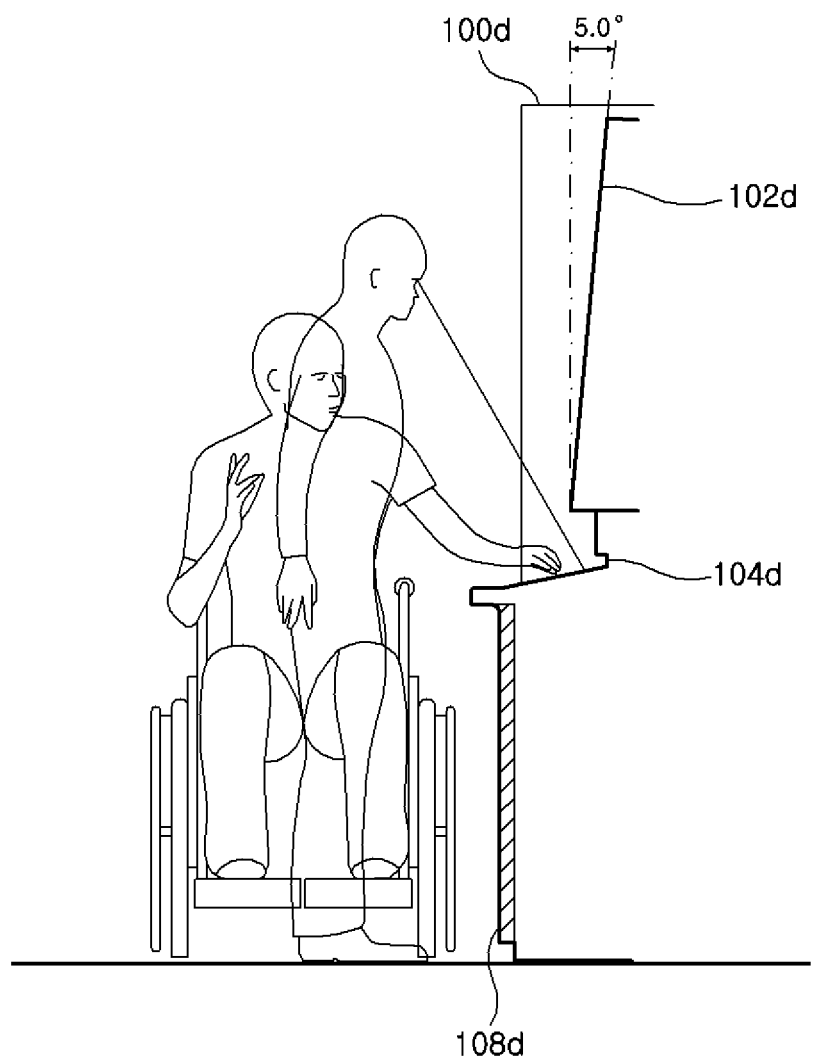

FIG. 17 is a vertical sectional view illustrating the result obtained in FIG. 16. When the automatic teller machine is in the standby mode or when the motion of a user is not detected, the first interface unit 102d tilted and moved backward may be slid up and returned to the original state. The illustration of this situation is omitted.

Figure 18:
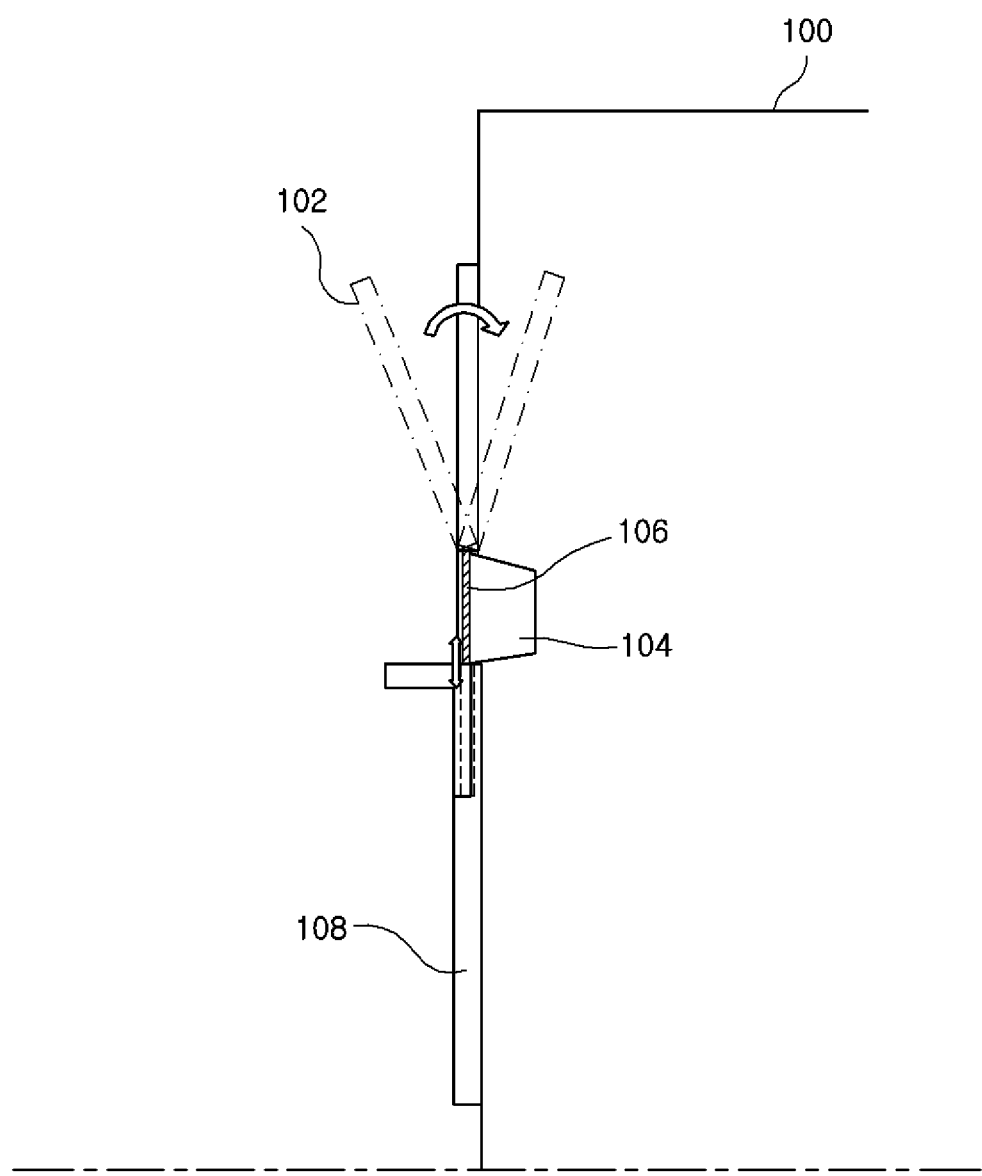
FIG. 18 is a sectional view illustrating an automatic teller machine according to a fifth embodiment.

FIG. 18 is a view illustrating the automatic teller machine in this embodiment. In FIG. 18, there is illustrated a case where the front panel 106 is slid down along the machine front portion 100 to expose the operation parts of the second interface unit 104. At this time, the lower panel 108 is kept in a fixed state.

In FIGS. 14 to 17, there is illustrated a case where the first interface unit 102d is tilted backward. However, as illustrated in FIG. 18, the first interface unit 102 may also be tilted forward as needed. In addition to the forward/backward tilting operation, the first interface unit 102 may move backward.

Figure 19:
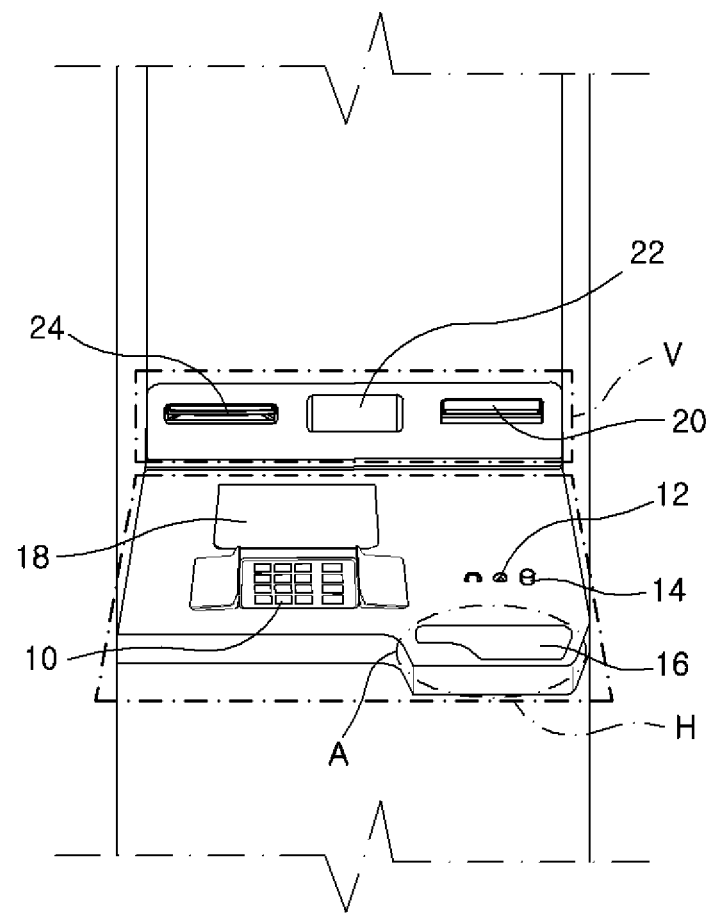
FIG. 19 is a view illustrating a plurality of operation parts installed in a second interface unit of the automatic teller machine according to the embodiments.

FIG. 19 is a perspective view illustrating a plurality of operation parts installed in the second interface unit 104 of the automatic teller machine according to the embodiments of the present disclosure. The operation parts may include an encryption key pad 10, an earphone jack 12, a fingerprint recognition module 14, an NFC module 16, a deposit/withdrawal port 18 of a cash deposit/withdrawal unit, a deposit/withdrawal port 20 of a check deposit/withdrawal unit, a card insertion port 22 of a card processing unit, a discharge port 24 of a transaction slip issuing unit, and so forth.

The second interface unit 104 having the operation parts may include a first arrangement area V in which some of the operation parts are disposed and a second arrangement area H in which the remaining operation parts are disposed. For example, the first arrangement area V may be substantially vertically disposed and the second arrangement area H may be substantially horizontally disposed.

The key pad 10, the earphone jack 12, the fingerprint recognition module 14, the NFC module 16 and the deposit/withdrawal port 18 of the cash deposit/withdrawal unit may be disposed in the second arrangement area H. The deposit/withdrawal port 20 of the check deposit/withdrawal unit, the card insertion port 22 of the card processing unit and the discharge port 24 of the transaction slip issuing unit may be disposed in the first arrangement area V.

As illustrated in FIG. 19, the encryption key pad 10 includes, for example, a pin pad. For example, the operation parts are hidden within the automatic teller machine and are exposed to the outside. Since the second interface unit 104 is configured to be located inward of the automatic teller machine even when exposed to the outside, it is possible to easily realize the second interface unit 104 under an interface environment, such as a pin pad or the like, which requires a high level of security.

The earphone jack 12 may be connected to a voice output module installed within the automatic teller machine. A user may connect an earphone to the earphone jack 12 and may receive a voice guide of financial services, for example, a voice guide capable of providing enhanced use convenience to a visually handicapped person.

The fingerprint recognition module 14 is a means for enhancing the security in the financial serves and the reliability of financial transaction.

The NFC module 16 is one kind of wireless receiving module which enables a user to pre-input information through an application of a mobile terminal which enables a user to rapidly finish automatic teller transaction through NFC contact. The NFC module 16 may be attached to the outside of the automatic teller machine, preferably to the exposed area A of the second interface unit 104. The exposed area A refers to an area which is always exposed even when one of the shutter type front panel 106a, the glass type front panel 112, the lower panel 108d and the first interface unit 102b is moved to the first position in which the operation parts installed in the second interface units 104a, 104b, 104c and 104d are hidden from the outside. Since the NFC module 16 is attached to the exposed area A, it is possible to immediately detect a user's NFC signal when a user gains access to the automatic teller machine.

The deposit/withdrawal port 18 of the cash deposit/withdrawal unit is a means for enabling a user to deposit cash to the automatic teller machine or to withdraw cash from the automatic teller machine.

The deposit/withdrawal port 20 of the check deposit/withdrawal unit is a means for enabling a user to deposit a check to the automatic teller machine or to withdraw a check from the automatic teller machine.

The card insertion port 22 of the card processing unit is a means for receiving various kinds of cards (e.g., a cash card and a check card) inserted by a user and for discharging a card which has been processed.

The discharge port 24 of the transaction slip issuing unit is a means for printing and dispensing a slip which indicates details of financial transaction.

The embodiments of the present disclosure described above are nothing more than exemplary ones. It should be noted that the operation parts, the display unit and the like of the automatic teller machine may be operated in many different ways which are not illustrated in the drawings. Furthermore, various kinds of key pads installed in the operation parts, modules, deposit/withdrawal units and the like have been described to increase the understanding of the embodiments of the present disclosure. It should be noted that different types of modules or key input means may be used according to the user's service demand or the diversity of financial services.

According to the embodiments of the present disclosure, it is possible to prevent exposure of the operation parts of the automatic teller machine and to minimize exposure of personal information around the automatic teller machine. Furthermore, according to the embodiments of the present disclosure, it is possible to increase the screen information expressions. This makes it possible to enhance the operation convenience and to increase the corporate marketing utilization.

What is claimed is:

1. An automatic teller machine, comprising:
   a first interface unit configured to display financial information for a financial transaction to a user, the first interface unit installed in a front upper region of the automatic teller machine;
   a second interface unit disposed in a region different from a region in which the first interface unit is disposed, the second interface unit having a plurality of operation parts to be operated by the user, the second interface unit installed below the first interface unit;
   a front panel movable to a first position in which the plurality of operation parts are hidden from outside of the automatic teller machine and a second position in which the plurality of operation parts are exposed to the outside of the automatic teller machine, the front panel being slidable up or down between the first position and the second position;
   a detection unit configured to detect body information of a user of the automatic teller machine, the body information comprising information regarding on a stature of the user or whether the user is in a wheelchair; and
   a control unit configured to control the front panel to be located in one of the first position and the second position and control a tilting angle of the first interface based on the body information,
   wherein the second interface unit is configured to protrude forwardly from the automatic teller machine when the front panel is moved to the second position.

2. The machine of claim 1, wherein the control unit is configured to control the front panel to be located in the first position when the automatic teller machine is operated in a standby mode in which the financial transaction is not performed, and to control the front panel to be located in the second position when the automatic teller machine is operated in an operation mode in which the financial transaction is performed.

3. The machine of claim 2, wherein the first interface unit is configured to display advertisement information in the standby mode.

4. The machine of claim 2,
   wherein the detection unit is configured to detect access of the user, and
   wherein the control unit is configured to switch the standby mode to the operation mode when the access of the user is detected by the detection unit.

5. The machine of claim 2, wherein the first interface unit includes a touch-input-type display module, and
   the control unit is configured to switch the standby mode to the operation mode when touch input of the user through the display module is detected in the standby mode.

6. The machine of claim 1, wherein the front panel is made of a transparent material, and
   the second interface unit further includes a light source configured to illuminate the operation parts.

7. The machine of claim 1,
   wherein the front panel is a movable transparent front panel slidably installed in front of the first interface unit and located in one of the first position in which the first interface unit and the second interface unit are hidden by the front panel and the second position in which the second interface unit is exposed to the outside.

8. An automatic teller machine, comprising:
   a first interface unit configured to display financial information for financial transaction to a user;
   a second interface unit disposed in a region different from a region in which the first interface unit is disposed, the second interface unit having a plurality of operation parts to be operated by the user that include a first arrangement area vertically disposed in which some of the operation parts are disposed and a second arrangement area horizontally disposed in which the remaining operation parts are disposed;
   a front panel movable to a first position in which the plurality of operation parts are hidden from outside of the automatic teller machine and a second position in which the plurality of operation parts are exposed to the outside of the automatic teller machine;
   a detection unit configured to detect body information of a user of the automatic teller machine, the body information comprising information regarding on a stature of the user or whether the user is in a wheelchair; and
   a control unit configured to control the front panel to be located in one of the first position and the second position and control a tilting angle of the first interface based on the body information,
   wherein the second interface unit is configured to protrude forwardly from the automatic teller machine when the front panel is moved to the second position.

9. The machine of claim 8,
   wherein the first arrangement area includes an exposed area which is always exposed even when the front panel is moved to the first position, and
   wherein the automated teller machine further comprises a wireless receiving unit configured to receive information for financial transaction from the user in a wireless manner is disposed in the exposed area.

10. The machine of claim 8, wherein the operation parts include at least one of a pin pad installed in the second arrangement area to receive information for financial transaction and a deposit/withdrawal port installed in the second arrangement area to allow the user to deposit or withdraw cash or a check.

11. The machine of claim 8, wherein the some of the operation parts include at least one of a card insertion/removal port disposed in the first arrangement area to allow the user to insert or remove a financial transaction card and a transaction slip discharge port disposed in the first arrangement area to discharge a financial transaction slip.

12. An automatic teller machine, comprising:
a first interface unit configured to display financial information for financial transaction to a user, the first interface unit installed in a front upper region of the automatic teller machine;
a second interface unit disposed below the first interface unit, the second interface unit installed below the first interface unit;
a lower panel disposed below the first interface unit and configured to move up and down to a first position in which the plurality of operation parts are hidden from outside of the automatic teller machine and a second position in which the plurality of operation parts are exposed to the outside of the automatic teller machine, the lower panel being slidable up or down between the first position and the second position;
a detection unit configured to detect body information of a user of the automatic teller machine, the body information comprising information regarding on a stature of the user or whether the user is in a wheelchair; and
a control unit configured to control the lower panel to be located in one of the first position and the second position and control a tilting angle of the first interface based on the body information,
wherein the second interface unit is configured to protrude forwardly from the automatic teller machine when the lower panel is moved to the second position.

13. An automatic teller machine, comprising:
a first interface unit configured to display financial information for financial transaction to a user and slidably disposed in a front upper region of the automatic teller machine;
a second interface unit disposed below the first interface unit and provided with a plurality of operation parts to be operated by the user;
a detection unit configured to detect body information of a user of the automatic teller machine, the body information comprising information regarding a stature of the user or whether the user is in a wheelchair; and
a control unit configured to control the first interface unit to be located in one of a first position in which the plurality of operation parts are hidden from outside of the automatic teller machine and a second position in which the plurality of operation parts are exposed to the outside of the automatic teller machine and control a tilting angle of the first interface based on the body information,
wherein the second interface unit is configured to protrude forwardly from the automatic teller machine when a lower panel deposed below the first interface unit is moved to the second position.

14. The machine of claim 13, wherein the second interface unit includes a first arrangement area vertically disposed in which some of the operation parts are disposed and a second arrangement area horizontally disposed in which remaining operation parts are disposed.

15. An automatic teller machine, comprising:
a first interface unit configured to display financial information for financial transaction to a user;
a second interface unit disposed below the first interface unit, the second interface unit having a plurality of operation parts to be operated by the user that include a first arrangement area vertically disposed in which some of the operation parts are disposed and a second arrangement area horizontally disposed in which remaining operation parts are disposed;
a lower panel disposed below the first interface unit and configured to move up and down to a first position in which the plurality of operation parts are hidden from outside of the automatic teller machine and a second position in which the plurality of operation parts are exposed to the outside of the automatic teller machine;
a detection unit configured to detect body information of a user of the automatic teller machine, the body information comprising information regarding a stature of the user or whether the user is in a wheelchair; and
a control unit configured to control the lower panel to be located in one of the first position and the second position and control a tilting angle of the first interface based on the body information,
wherein the second interface unit is configured to protrude forwardly from the automatic teller machine when the lower panel is moved to the second position.

* * * * *